(12) United States Patent
Cheng et al.

(10) Patent No.: US 12,238,264 B2
(45) Date of Patent: Feb. 25, 2025

(54) METHOD AND DEVICE FOR THREE-DIMENSIONAL LIGHT DETECTION AND RANGING (LIDAR), AND THREE-DIMENSIONAL MEASURING DEVICE THEREOF

(71) Applicant: Realsee (Beijing) Technology Co., Ltd., Beijing (CN)

(72) Inventors: Xianyu Cheng, Beijing (CN); Ka Guan, Beijing (CN)

(73) Assignee: Realsee (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 18/465,793

(22) Filed: Sep. 12, 2023

(65) Prior Publication Data
US 2023/0421744 A1  Dec. 28, 2023

Related U.S. Application Data

(63) Continuation of application No. 17/345,323, filed on Jun. 11, 2021, now Pat. No. 11,805,235.

(30) Foreign Application Priority Data

Jun. 19, 2020 (CN) .......................... 202021158157.4
Jul. 1, 2020 (CN) .......................... 202021269287.5

(51) Int. Cl.
| H04N 13/254 | (2018.01) |
| G01S 7/481 | (2006.01) |
| G01S 17/86 | (2020.01) |
| G01S 17/89 | (2020.01) |
| H04N 13/246 | (2018.01) |
| H04N 13/296 | (2018.01) |
| H04N 23/51 | (2023.01) |
| H04N 23/90 | (2023.01) |

(52) U.S. Cl.
CPC ......... *H04N 13/254* (2018.05); *G01S 7/4817* (2013.01); *G01S 17/86* (2020.01); *G01S 17/89* (2013.01); *H04N 13/246* (2018.05); *H04N 13/296* (2018.05); *H04N 23/51* (2023.01); *H04N 23/90* (2023.01)

(58) Field of Classification Search
CPC .. H04N 13/254; H04N 13/246; H04N 13/296; H04N 23/51; H04N 23/90; G01S 17/89; G01S 17/86
USPC .......................................................... 348/47
See application file for complete search history.

(56) References Cited

U.S. PATENT DOCUMENTS

2020/0064483 A1  2/2020  Li et al.

*Primary Examiner* — Nguyen T Truong
(74) *Attorney, Agent, or Firm* — Leydig, Voit & Mayer, Ltd.

(57) ABSTRACT

A three-dimensional imaging apparatus includes: a housing having a first opening and a second opening; a first imaging device configured to collect a first set of image data, the first imaging device being mounted within the housing and having an optical axis through the first opening of the housing and a first field of view configured with respect to the optical axis; and a second imaging device configured to collect a second set of image data, the second imaging device being mounted within the housing and having a scanning plane through the second opening of the housing and a second field of view configured with respect to the scanning plane. The optical axis of the first imaging device and the scanning plane of the second imaging device form an angle. The first field of view and the second field of view do not overlap.

20 Claims, 11 Drawing Sheets

METHOD AND DEVICE FOR THREE-DIMENSIONAL LIGHT DETECTION AND RANGING (LIDAR), AND THREE-DIMENSIONAL MEASURING DEVICE THEREOF

CROSS-REFERENCE TO RELATED APPLICATION

This application is a continuation of U.S. application Ser. No. 17/345,323, filed on Jun. 11, 2021, now issued U.S. Pat. No. 11,805,235. This application claims the benefits of priorities to Chinese Patent Application No. 202021269287.5, filed on Jul. 1, 2020, and Chinese Patent Application No. 202021158157.4, filed on Jun. 19, 2020, which are incorporated by references herein in their entireties.

FIELD

Generally, the present disclosure relates to the field of three-dimensional (3D) imaging and, more specifically, to a method and device for 3D imaging and measuring based on light detection and ranging.

BACKGROUND

Indoor three-dimensional (3D) imaging devices may include structured light cameras and light detection and ranging (LiDAR) scanners. Existing structured light cameras have a short visual distance and large deviations. Existing LiDAR scanners have a long visual distance up to, for example, 100 meters or even more. Existing LiDAR scanners may provide highly accurate but slow scanning. These 3D imaging devices are mostly used for industrial applications. Thus, 3D imaging devices are usually expensive industrial equipment. There are few consumer-level 3D imaging devices. In addition, existing 3D imaging devices may be bulky and difficult to manipulate and carry around.

Therefore, there is a need for a 3D imaging device with a compact and lightweight design that provides high efficiency and accuracy. Such a 3D imaging device may allow large-scale, easy applications in, for example, the real-estate industry.

SUMMARY

In an exemplary embodiment, the present disclosure provides a three-dimensional (3D) imaging apparatus. The three-dimensional imaging apparatus includes: a housing having a first opening and a second opening; a first imaging device configured to collect a first set of image data, the first imaging device being mounted within the housing and having an optical axis through the first opening of the housing and a first field of view configured with respect to the optical axis; and a second imaging device configured to collect a second set of image data, the second imaging device being mounted within the housing and having a scanning plane through the second opening of the housing and a second field of view configured with respect to the scanning plane. The optical axis of the first imaging device and the scanning plane of the second imaging device form an angle. The first field of view of the first imaging device and the second field of view of the second imaging device do not overlap.

The first imaging device is a camera and the second imaging device is a light detection and ranging (LiDAR) scanner.

The optical axis of the first imaging device extends in a first direction and the scanning plane of the second imaging device extends along a second direction that is perpendicular to the first direction.

The first and second imaging devices are mounted next to each other along the second direction within the housing.

The first direction is a horizontal direction and the second direction is a vertical direction.

The angle between the optical axis of the first imaging device and the scanning plane of the second imaging device is between 70° and 110°.

The angle between the optical axis of the first imaging device and the scanning plane of second imaging device is 90°.

The housing has a first slanted surface formed on a first side of the first opening and a second slanted surface formed on a second side of the first opening, wherein the first slanted surface and the second slanted surface form an angle of 150°.

The second opening is configured around the second imaging device and defines a maximum angle of 150° for the second field of view of the second imaging device in scanning plane of the second imaging device.

The second field of view includes the second direction.

The three-dimensional imaging apparatus further includes: a first motor having a first rotational axis along the second direction and configured to rotate the first and second imaging devices.

The three-dimensional imaging apparatus further includes: a computer-readable medium having computer-executable instructions stored thereon and a processor configured to execute the computer-executable instructions to carry out: controlling the first motor to rotate the first and second imaging devices a first angle about the first rotational axis; controlling the first and second imaging devices to collect the first and second sets of image data; and merging the first and second sets of imaging data according to the angle between the optical axis of the first imaging device and the scanning plane of the second imaging device. The first angle is between 0° and 360°.

The three-dimensional imaging apparatus further includes: a second motor having a second rotational axis along a third direction and configured to rotate the first and second imaging devices about the second rotational axis, the third direction being perpendicular to the first and second directions.

The processor is configured to execute the computer-executable instructions to control the second motor to rotate the first and second imaging devices a second angle about the second rotational axis, wherein the second angle is between 0° and 360°.

In another exemplary embodiment, the present disclosure provides a method of controlling a three-dimensional imaging apparatus having a first imaging device and a second imaging device disposed therein. The method includes: rotating the first and second imaging devices by a first motor about a first rotational axis, the first imaging device having an optical axis extending along a first direction, the second imaging device having a scanning plane extending along a second direction, the optical axis of the first imaging device and the scanning plane of the second imaging device forming a first angle between 0° and 360; starting the first and second imaging devices to collect a first and second sets of image data, respectively; receiving the first set of image data from the first imaging device and the second set of image data from the second imaging device; and merging the first and second sets of image data according in part to the angle between the optical axis of the first imaging device and the scanning plane of the second imaging device.

The method further includes: a) sending an instruction to the first motor indicating a first expected rotational angle; b) rotating the first and second imaging devices from a first position to a second position according to the instruction; c) determining a first rotational angle between the first position and the second position; and d) determining a first error between the first expected rotational angle and the first rotational angle.

The method further includes: carrying out a)-d) for a plurality of iterations; and determining a statistical distribution of the first error.

The method further includes: determining a first coordinate of a calibration object based on at least one of the first or second sets of image data when the first and second imaging devices are at the first position; determining a second coordinate of the calibration object based on at least one of the first or second sets of image data when the first and second imaging devices are at the second position; and determining the first rotational angle based on the first coordinate and the second coordinate of the calibration object.

The three-dimensional imaging apparatus further includes a second motor configured to rotate the first and second imaging devices for a second angle about a third axis that is perpendicular to the first and second axes. The method further includes: e) sending an instruction to the second motor indicating a second expected rotational angle; f) rotating the first and second imaging devices from a third position to a fourth position according to the instruction; g) determining a second rotational angle between the third position and the fourth position; and h) determining a second error between the second expected rotational angle and the second rotational angle. The second angle is between 0° and 360°.

The method further includes: carrying out e)-h) for a plurality of iterations; and determining a statistical distribution of the second error.

The method further includes: determining a third coordinate of a calibration object based on at least one of the first or second sets of image data when the first and second imaging devices are at the third position; determining a fourth coordinate of the calibration object based on at least one of the first or second sets of image data when the first and second imaging devices are at the fourth position; and determining the second rotational angle based on the third coordinate and the fourth coordinate of the calibration object.

BRIEF DESCRIPTION OF THE DRAWING(S)

DETAILED DESCRIPTION

Figure 1:
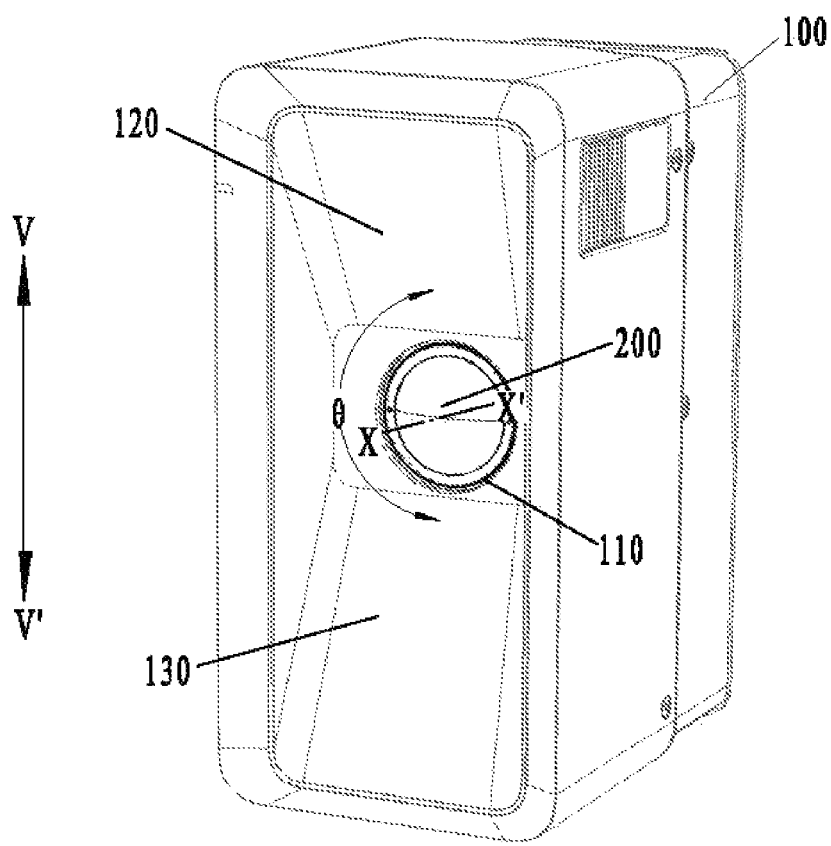
FIG. 1 is a schematic diagram of a three-dimensional imaging apparatus according to an exemplary embodiment of the present disclosure.

Exemplary embodiments of the present disclosure provide a three-dimensional (3D) imaging apparatus based on light detection and ranging (LiDAR) that may be used for consumer applications on a large scale. The three-dimensional imaging apparatus may include a LiDAR scanner and a camera with a compact and lightweight design. The three-dimensional imaging apparatus may also provide high efficient imaging and measuring. The three-dimensional imaging apparatus disclosed herein may be much less costly and more user-friendly than existing three-dimensional imaging devices. The three-dimensional imaging apparatus disclosed herein may enjoy a wide variety of applications including, but not limited to, real-estate applications, such as imaging and measuring real properties.

According to some embodiments, the 3D imaging apparatus may include a first imaging device and a second imaging device integrated in a housing. The first imaging device may be a camera, and the second imaging device may be a LiDAR scanner. The camera may have a lens system. The lens system may define an optical axis and a field of view. The camera may receive light from a 3D scene through the lens system and generate images of the 3D scene based on the received light.

The LiDAR scanner may have a transmitter that generates and transmits structured light, such as laser, to the 3D scene and a receiver that receives portion of the structured light reflected by the 3D scene. The LiDAR device may provide a scanning function by moving the structured light through the 3D scene according to a defined direction, such as a vertical direction or a horizontal direction. The reflected structured light received during the scanning of the 3D scene may be used to form a 3D model of the 3D scene. The moving structured light may define a scanning plane of the LiDAR scanner that intercepts with the 3D scene. The 3D model of the 3D scene may be reconstructed or generated according to the scanning plane. The structured light moving within the scanning plane may form a field of view defined by an angle.

According to some embodiments, the first imaging device and the second imaging device are arranged in such a manner so that the field of view of the first imaging device and the field of view of the second imaging device do not overlap each other. For example, the first imaging device and the second imaging device may be staggered so that the first optical axis of the first imaging device and the scanning plane of the second imaging device form an angle.

According to some embodiments, the 3D imaging apparatus may further include a first motor that rotates the first and second imaging devices about a first axis so that the first and second imaging devices may perform a scanning of the 3D scene about the first axis. The 3D imaging apparatus may further include a second motor that rotates the first and second imaging devices about a second axis so that the first and second imaging devices may perform a scanning of the 3D scene about the second axis.

According to some embodiments, the 3D imaging apparatus may be calibrated using images of the 3D scene. For example, when the 3D imaging apparatus is at a first position, a first image may be taken. A first signal may be sent to the first motor indicating a first target rotational angle. Upon receiving the first signal, the first motor may rotate the 3D imaging apparatus by a first rotational angle from the first positional to a second position. A second image may be taken by the 3D imaging apparatus when it is at the second position. The first image and second image may be compared to determine the first rotational angle. A difference between the first rotational angle and the first target rotational angle indicated by the first signal may be determined and used to calibrate the first motor. The second motor may be calibrated in a likewise manner. Thus, the quality of the data collected by the 3D imaging apparatus may be improved.

Figure 2:
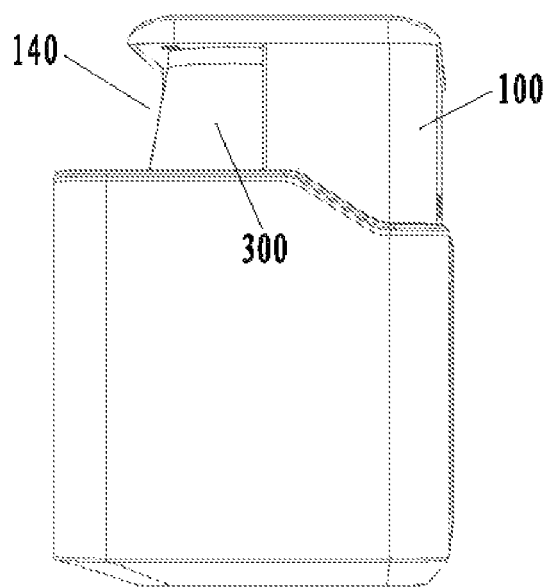
FIG. 2 is a schematic top view of the three-dimensional imaging apparatus according to an exemplary embodiment of the present disclosure.
Figure 3:
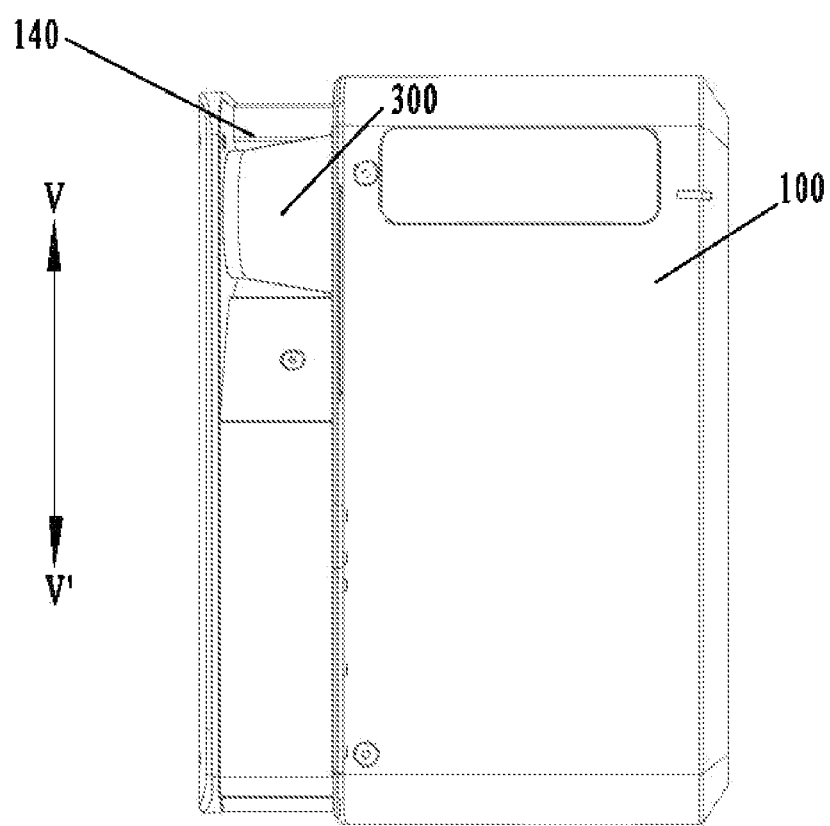
FIG. 3 is a schematic side view of the three-dimensional imaging apparatus according to an exemplary embodiment of the present disclosure.

FIGS. 1-3 show schematic perspective views of a three-dimensional (3D) imaging apparatus 105 according to some embodiments of the present disclosure. As shown in the figures, the 3D imaging apparatus 105 may be oriented in the 3D scene as desired. For ease of discussion, a vertical direction VV' may be indicated by an arrow VV' as shown in FIGS. 1 and 3 according to an embodiment.

3D imaging apparatus 105 may include a housing 100, a first imaging device 200, and a second imaging device 300. Housing 100 may include a first opening 110 (shown in FIG. 1) and a second opening 140 (shown in FIGS. 2 and 3), according to some embodiments.

First imaging device 200 may be configured to generate a first set of image data. First imaging device 200 may operate according to principles known in the art. For example, First imaging device 200 may be an optical camera, a heat detector, an X-ray detector, a Gamma-ray detector, etc. Thus, the first set of image data may be two-dimensional images including information imparted onto a sensor of first imaging device 200 according to one or more of those known principles.

Figure 4:
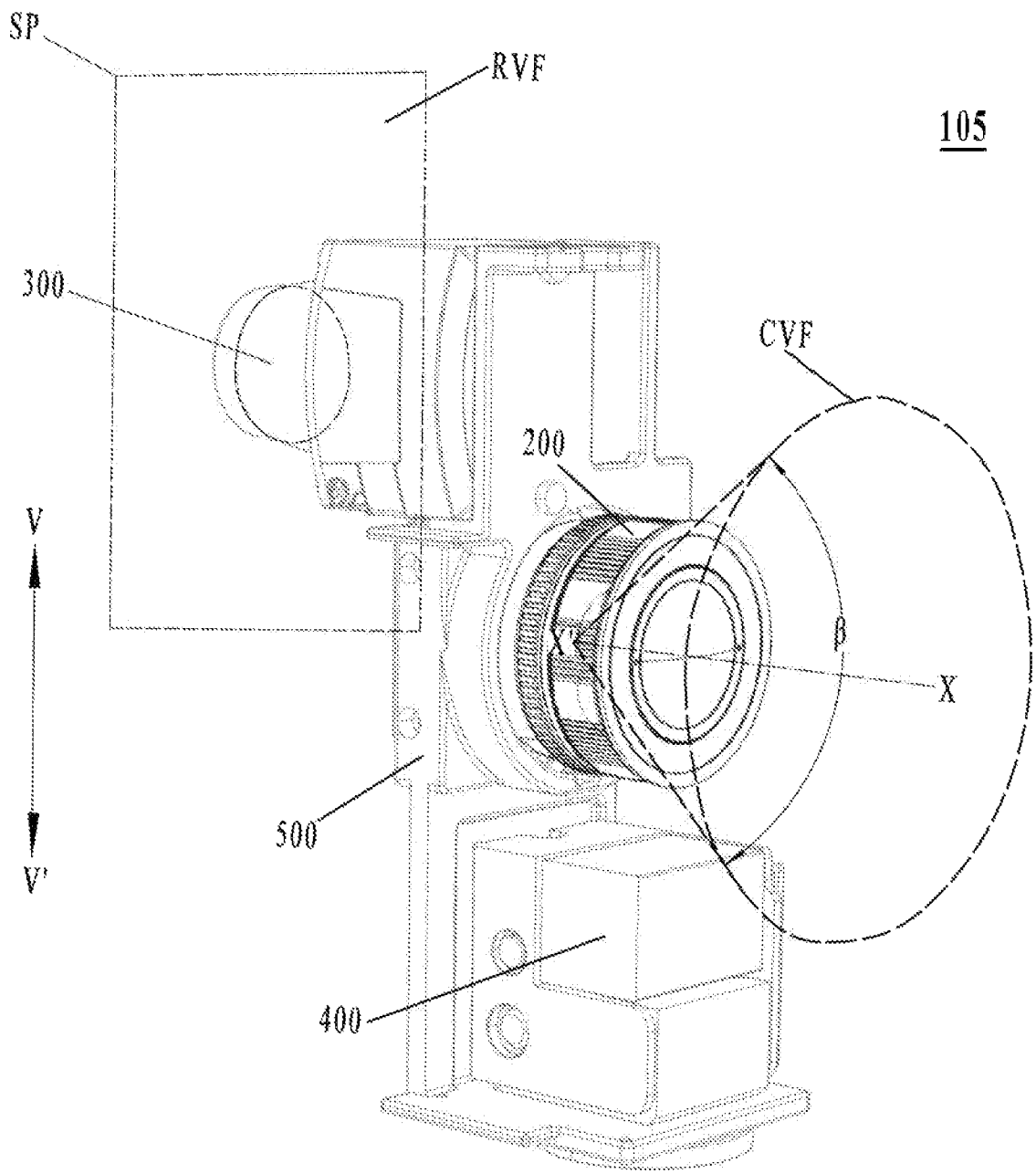
FIG. 4 is a schematic diagram of the internal components of the three-dimensional imaging apparatus according to an exemplary embodiment of the present disclosure, in which the housing of the three-dimensional imaging apparatus is removed.
Figure 5:
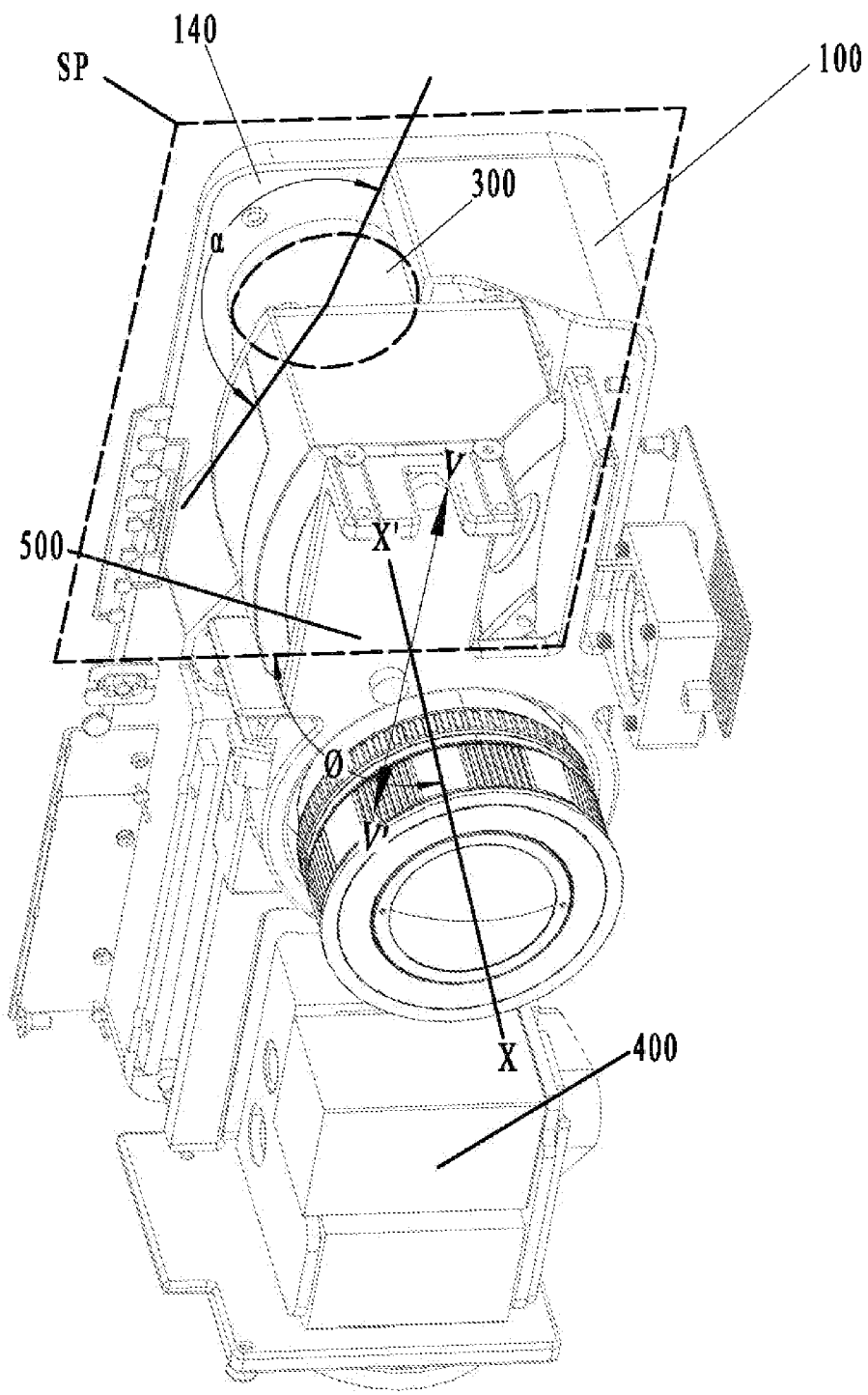
FIG. 5 is a schematic diagram of the internal components of the three-dimensional imaging apparatus according to an exemplary embodiment of the present disclosure, in which the housing is partially removed.
Figure 6:
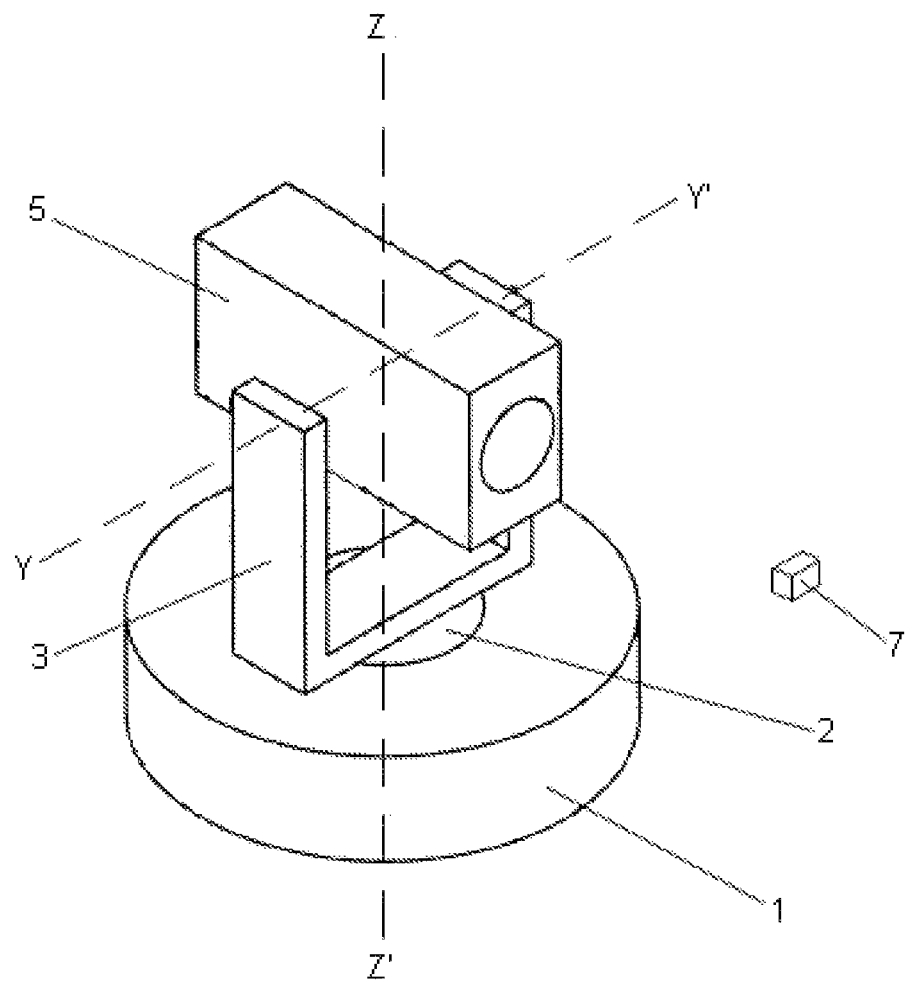
FIG. 6 is a schematic diagram of the three-dimensional imaging apparatus having a function as a three-dimensional measuring device according to an exemplary embodiment of the present disclosure.

FIGS. 4 and 5 show schematic perspective view of the internal components of the 3D imaging apparatus 105 according to some embodiments of the present disclosure, where the housing 100 is removed to reveal internal structures. According to an embodiment, first image device 200 may include a lens system which has an optical axis as indicated by a XX' line shown in FIGS. 4 and 5. The lens system of first imaging device 200 has a field of view that may be defined or configured with respect to the optical axis XX'. The field of view of first imaging device 200 may be, for example, a cone-shaped field of view (CVF) as shown in FIG. 4. The optical axis XX' may be the axis of the cone-shaped field of view. The field of view of first imaging device 200 may also have other geometrical shape, such as a cylindrical shape, a fan shape, etc.

According to some embodiments, first imaging device 200 may collect images of the surrounding environment (e.g., the 3D scene) that falls within the field of view of first imaging device 200. The images of the surrounding environment collected by first imaging device 200 may be referred to as environmental images, which may reflect the environment, appearance of the environment, and/or appearance of an object of the environment. According to an embodiment, the images collected by first imaging device 200 may be two-dimensional images that may be color images, black-and-white images, or grayscale images.

In some embodiments, as shown in FIG. 1, housing 100 of 3D imagining apparatus 105 may have a first opening 110. First imaging device 200 may be disposed within housing 100 so that the lens system of first imaging device 200 is substantially close to and aligned with first opening 110. Thus, the optical axis XX' of first imaging device 200 may go through the first opening 110 and be aligned with the axis of first opening 110. The field of view of first imaging device 200 may extend through first opening 110.

According to some embodiments, second imaging device 300 may be configured to scan and generate three-dimensional information of the environment or the scene. For example, second imaging device 300 may be a scanner that operates according to the light detection and ranging (LiDAR) principle known in the art. Specifically, second imaging device 300 may include a laser transceiver that emits laser signals towards the 3D scene and receive returned laser signals from the 3D scene. Second imaging device 300 may include a processor configured to generate 3D information of the scene based on the returned laser signals. Alternatively, second imaging device 300 may transmit data representing the returned laser signals to an off-board processor, which may generate the 3D information of the scene. The 3D information of the scene may be a 3D model including 3D coordinate data that represent features of the 3D scene.

According to a further embodiment as shown in FIGS. 4 and 5, second imaging device 300 may have one scanning plane (SP). The laser signals emitted by second imaging device 300 may be kept within the scanning plane. Specifically, the laser signals emitted by second imaging device 300 may include a laser beam that is moved within the scanning plane. Scanning of the 3D scene may be conducted by rotating or swiping the laser beam within the scanning plane across a field of view (RVF) of second imaging device 300. The field of view of second imaging device 300 may be defined by an angle a as shown in FIG. 5. According to some embodiments, second imaging device 300 may have more than one scanning plane.

According to some embodiments, housing 100 of the 3D imaging apparatus 105 may have a second opening 140 as shown in FIGS. 2, 3, and 5. The scanning plane and the field of view of second imaging device 300 may extend through second opening 140.

According to some embodiments, second imaging device 300 may determine 3D coordinates of a feature point of the 3D scene by comparing parameters of the emitted laser signals and the returned laser signals. The coordinates of the feature point determined by second imaging device 300 fall on the intersection between the 3D scene and the scanning plane of second imaging device 300. As such, second imaging device 300 collects the coordinates of a plurality of points of the 3D scene that fall on the scanning plane. These points contain 3D information of the 3D scene and may form a point cloud that represents a 3D structural model of the 3D scene.

According to an embodiment, the 2D images collected by first imaging device 200 represent an appearance of the 3D scene, such as the colors or textures of the objects of the 3D scene. According to an embodiment, data collected by second imaging device 300 may include 3D information of the 3D scene. The 3D information may be a 3D point cloud that represents, for example, a structural model of the 3D scene. The structural model of the 3D scene may be combined with the 2D images collected by first imaging device 200 to generate a 3D virtual reality representation of the 3D scene. For example, the 2D images collected by first imaging device 200 may be mapped to the 3D model generated by second imaging device 300 based on position, orientation, and/distance information included in the data collected by first imaging device 200 and second imagine device 300. The resulting 3D virtual reality representation of the 3D scene may include the 3D model modified by the color information of the 2D images.

According to a further embodiment, as shown in FIGS. 4 and 5, the optical axis (indicated by line XX') of first imaging device 200 extends in a first direction and the scanning plane of second imaging device 300 extends along a second direction that is perpendicular to the first direction. First imaging device 200 and second imaging device 300 are mounted next to each other along the second direction within housing 100 of 3D imaging apparatus 105. According to a further embodiment, the first direction is a horizontal direction and the second direction is a vertical direction.

According to a further embodiment as shown in FIG. 5, the optical axis XX' of first imaging device 200 and the scanning plane of second imaging device 300 may form an angle Ø. The angle Ø may be sufficiently large so that the field of view of first imaging device 200 and the field of view of second imaging device 300 are outside of each other. In other words, the field of view of first imaging device 200 and the field of view of second imaging device 300 do not overlap each other. Accordingly, first imaging device 200 is not located on the scanning plane of second imaging device 300. And second imaging device 300 is not located in the field of view of first imaging device 200. As a result, data collected by second imaging device 300 does not include an image of first imaging device 200. Similarly, data collected by first imaging device 200 does not include an image of second imaging device 300.

As shown in FIGS. 4 and 5, because first imaging device 200 and second imaging device 300 are arranged in such a way that their fields of view do not overlap each other, first imaging device 200 and second imaging device 300 may be disposed as close as possible to each other and fit in a compact structure within housing 100 of 3D imaging apparatus 105. This arrangement of first imaging device 200 and second imaging device 300 may decrease the size of 3D imaging apparatus 105 compared with those of conventional designs. Thus, 3D imaging apparatus 105 may be used to perform three-dimensional modeling of a 3D scene in a small space, such as an interior of a house, a room, an office, or other settings. 3D imaging apparatus 105 described herein may replace existing three-dimensional imaging devices, which are large and bulky and may only be used for modeling of a large-scale space. In addition, because of the compact structure of 3D imaging apparatus 105, it may be easily stored and carried around by a user.

According to a further embodiment, second imaging device 300 may be mounted above first imaging device 200 within housing 100 in the vertical direction as shown in FIGS. 4 and 5. Alternatively, second imaging device 300 may be mounted under first imaging device 200 within housing 100 in the vertical direction VV'. Still further, the body structures of second imaging device 300 and first imaging device 200 may be disposed as close to each other as possible and may partially overlap each other along the vertical direction VV'.

Such arrangement of first imaging device 200 and second imaging device 300 reduces not only the size or footprint of 3D imaging apparatus 105 in the horizontal direction, but also the size or footprint of 3D imaging apparatus 105 in the vertical direction.

According to some embodiments, the angle Ø between the optical axis XX' of first imaging device 200 and the scanning plane of second imaging device 300 may be between 70° and 110°. According to some further embodiments, the angle Ø may be between 80° and 100°. According to still some further embodiment, the angle Ø may be about 90°.

These arrangements of first imaging device 200 and second imaging device 300 may avoid interferences between the two imaging devices and reduce the overall size and footprint of 3D imaging apparatus 105. In addition, these arrangements of first imaging device 200 and second imaging device 300 may also provide a large viewing angle along the vertical direction VV' for both imaging devices. As such, 3D imaging apparatus 105 may be able to collect more comprehensive data and generate more complete three-dimensional models of the 3D scene.

According to a further embodiment, housing 100 of 3D imaging apparatus 105, as shown in FIG. 1, may include a pair of slanted outer surfaces 120 and 130, which are formed on a first side and a second side of first opening 110. Specifically, as shown in FIG. 1, first slanted outer surface 120 may be formed on an upper side (i.e., the first side) of first opening 110. Second slanted outer surface 130 may be formed on a second side (i.e., the second side) of first opening 110. Alternatively, slanted surfaces 120 and 130 may be formed at other locations near first opening 110. For example, slanted surfaces 120 and 130 may be formed on the left and right sides of first opening 110, respectively. According to a further embodiment, slanted surfaces 120 and 130 may be flat or curved. According to a still further embodiment, slanted surfaces 120 and 130 may be formed and arranged symmetrically with respect to the optical axis XX' of first imaging device 200, as shown in FIG. 1.

The pair of slanted outer surfaces 120 and 130 may form an angle θ between each other. In a further embodiment, the angle θ between slanted surfaces 120 and 130 may be at least 150°. As such, slanted surfaces 120 and 130 define a limit of the field of view of first imaging device 200 along the vertical direction VV' (or any direction along which slanted surfaces 120 and 130 are disposed).

According to a further embodiment as shown in FIGS. 2, 3, and 5, housing 100 of 3D imaging apparatus 105 may include a second opening 140. The scanning plane of second imaging device 300, on which the field of view of second imaging device 300 is defined, may pass through second opening 140. The scanning plane of second imaging device 300 may extend along a second direction, such as the vertical direction VV', and pass through second opening 140.

According to a further embodiment, second opening 140 may be configured around second imaging device 300 and defines a maximum angle for the field of view of second imaging device 300. The maximum angle defined by second opening 140 may be at least 150°.

Through second opening 140, second imaging device 300 may transmit and receive signals, such as laser signals, within the maximum angle of the field of view in the scanning plane. In other words, second imaging device 300 may be configured to scan the 3D scene through second opening 140. The scanning may be done within the maximum angle of the field of view described above. Based on the data collected by scanning the 3D scene within the maximum angle of field of view, second imaging device 300 may generate a 3D model, which includes a point cloud representing 3D structural information of the 3D scene. As one of ordinary skilled in the art may appreciate, the larger the maximum angle of the field of view of second imaging device 300 provided by second opening 140, the more complete the 3D model generated by second imaging device 300 for the 3D scene.

According to a further embodiment as shown in in FIGS. 2, 3, and 5, second opening 140 may extends around second imaging device 300 beyond a point directly above second imaging device 300. As such, second imaging device 300 may be configured to transmit and receive scanning signals directly above second imaging device 300, thereby generating a comprehensive 3D model of the 3D scene.

According to a further embodiment, as shown in FIGS. 4 and 5, 3D imaging apparatus 105 may further include a motor 400 configured to drive first imaging device 200, second imaging device 300, and housing 100 (when installed) to rotate about a first axis, i.e., the rotational axis of motor 400. The rotational axis of motor 400, as shown in FIGS. 4 and 5, may be along the vertical direction VV', so that first imaging device 200 and second imaging device 300 may be rotated in a horizontal plane. Specifically, motor 400 may receive control signals from a control module (not shown) disposed within housing 100. In response to the control signals, motor 400 may rotate continuously or make one or more stops during rotation. First imaging device 200 and second imaging device 300 may receive control signals from the control module. In response to the control signals, imaging device 200 and second imaging device 300 may be activated to collect data of the 3D scene. For example, motor 400 may make a stop after rotating to a first angle in response to the control signals. While motor 400 stops, first imaging device 200 may be activated to capture an image, such as a 2D image, of the 3D scene, and second imaging device 300 may be activated to conduct a scanning of the 3D scene. After first imaging device 200 and second imaging device 300 complete the data collection, motor 400 may rotate to a second angle in response to additional control signals and stop at the second angle. First imaging device 200 and second imaging device 300 may be activated to capture additional data of the 3D scene. The process may then be repeated until motor 400 rotates for 360° or a desired amount of data of the 3D scene is collected.

Thereafter, all of the data collected by first imaging device 200 and second imaging device 300 may be combined to generate a virtual reality 3D model of the 3D scene. Specifically, the 2D images collected by first imaging device 200 may be combined to form a panoramic image of the 3D scene. The data collected by second imaging device 300 may be used to generate a point cloud representing the 3D model of the 3D scene. The panoramic image of the 3D scene may then be mapped to the 3D model of the 3D scene based on the relative positions and orientations of first imaging device 200 and second imaging device 300.

According to a further embodiment, as shown in FIGS. 4 and 5, 3D imaging apparatus 105 further includes a frame 500 that is mounted within housing 100. First imaging device 200, second imaging device 300, and motor 400 may be secured to frame 500. Frame 500 allows the positions and orientations of first imaging device 200, second imaging device 300, and motor 400 to be adjusted easily. Frame 500 further allows first imaging device 200, second imaging device 300, and motor 400 to be easily calibrated at the production stage of 3D imaging apparatus 105. After the calibration is completed, first imaging device 200, second imaging device 300, and motor 400 may be affixed to frame 500 to form an assembly, which may be easily disposed within housing 100 while the relative positions and orientations of the components therein are maintained during the production stage.

The calibration of first imaging device may include determining internal parameters of first imaging device 200, such as focal length, image center, distortions, etc., determining relative positions and orientations of first imaging device 200 and second imaging device 300, the orientation of the rotational axial of motor 400. Proper calibrations may be needed for generating high-quality virtual reality 3D model of the 3D scene.

In some exemplary embodiments, 3D imaging apparatus 105 may be set up on a tripod. Motor 400 is configured to drive 3D imaging apparatus 105, first imaging device 200 and second imaging device 300, to rotate horizontally in relation to the tripod. As such, 3D imaging apparatus 105 may be used to collect data of the 3D scene and generate a panoramic 3D model of the 3D scene. One of ordinary skilled in the art may appreciate that motor 400 may also be arranged outside of housing 100 directly on the tripod instead of being mounted within housing 100 of 3D imaging apparatus 105.

In some exemplary embodiments, 3D imaging apparatus 105 may include a second motor configured to rotate 3D imaging apparatus 105 or one of first imaging device 200 and second imaging device 300 individually about a second axis. The second axis may be perpendicular to the first axis (i.e., the rotational axis of motor 400). Specifically, FIGS. 6-9 show an embodiment of a 3D imaging apparatus 10 that is similar to 3D imaging apparatus 105 disclosed above.

3D imaging apparatus 10 may include a base 1 and a first motor 2 disposed on base 1. First motor 2 is similar to motor 400 as shown in FIGS. 4 and 5 and configured to rotate a frame 3 of 3D imaging apparatus 10. One of ordinary skilled in the art may appreciate that frame 3 may be similar to frame 500 as shown in FIGS. 4 and 5. 3D imaging apparatus 10 may include an imaging device 5 disposed on frame 3. One of ordinary skilled in the art may appreciate that imaging device 5 may be first imagining device 200, second imaging device 300, or a combination of first imaging device 200 and second imaging device 300 as shown in FIGS. 4 and 5.

First motor 2 may be configured to rotate in accordance with a first rotation signal from a control module (not shown) disposed within 3D imaging apparatus 10. The first rotation signal may indicate a first expected rotational angle set for motor 2. In some exemplary embodiments, first motor 2 may be a servo motor or a step motor. In response to the first rotation signal, motor 2 may drive frame 3 and imaging device 5 to rotate about a first axis (e.g., axis ZZ') from a first initial position to a first target position according to the first expected rotational angle. When motor 2 stops at the first target position, imaging device 5 may be triggered to capture a set of data of the 3D scene.

According to a further embodiment, first motor 2 may rotate and stop for multiple times based on the first rotation signal. At each stop, imaging device 5 may be activated to collect the data of the 3D scene. For example, imaging device 5 may be activated to capture a 2D image and/or to conduct a scanning of the 3D scene. First motor 2 may rotate for 360° or until a desired amount of data is collected.

Figure 7:
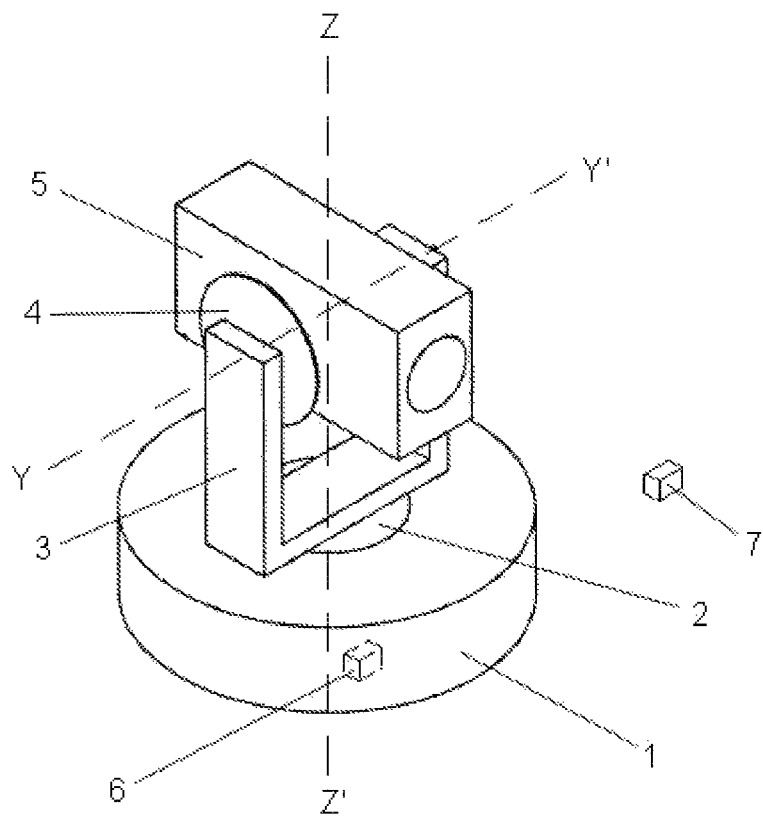
FIG. 7 is a schematic diagram of another aspect of the three-dimensional imaging apparatus having a function as a three-dimensional measuring device according to an exemplary embodiment of the present disclosure.
Figure 8:
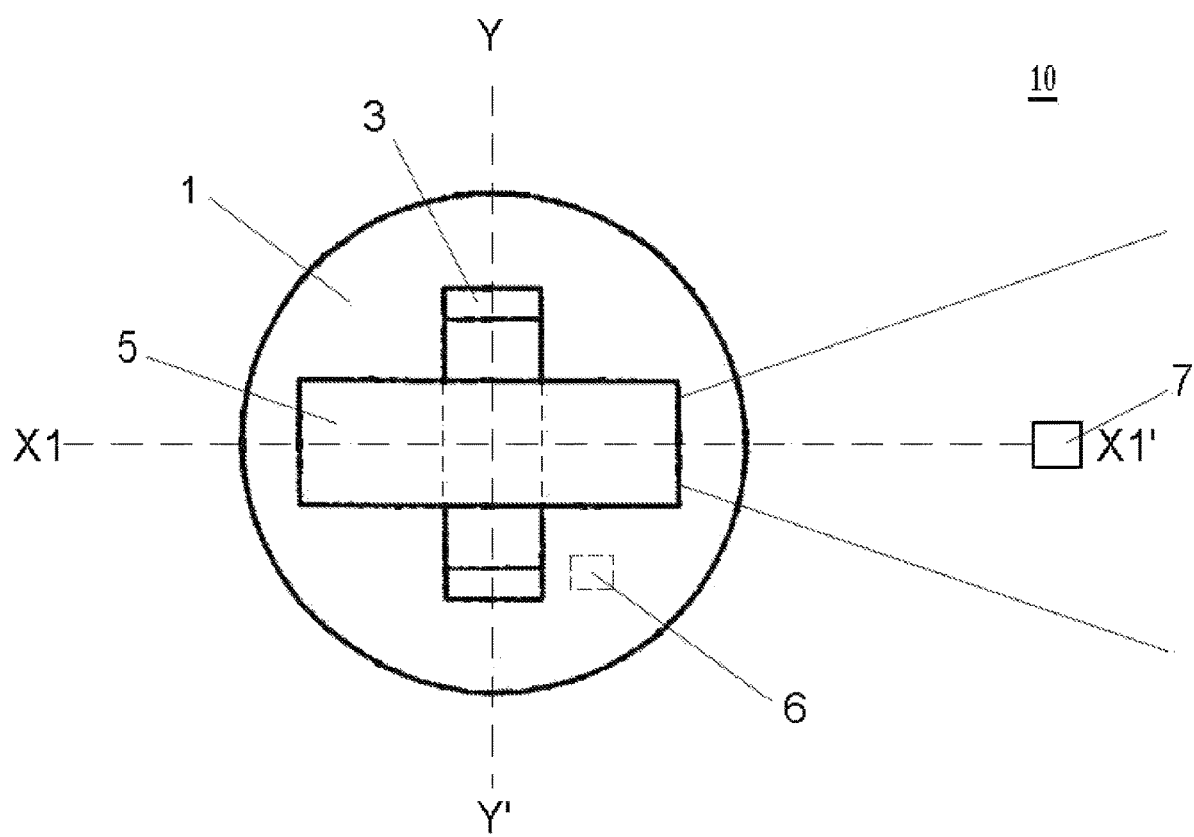
FIG. 8 is a schematic plan view of the three-dimensional imaging apparatus having a function as a three-dimensional measuring device shown in FIG. 7 according to an exemplary embodiment of the present disclosure.
Figure 9:
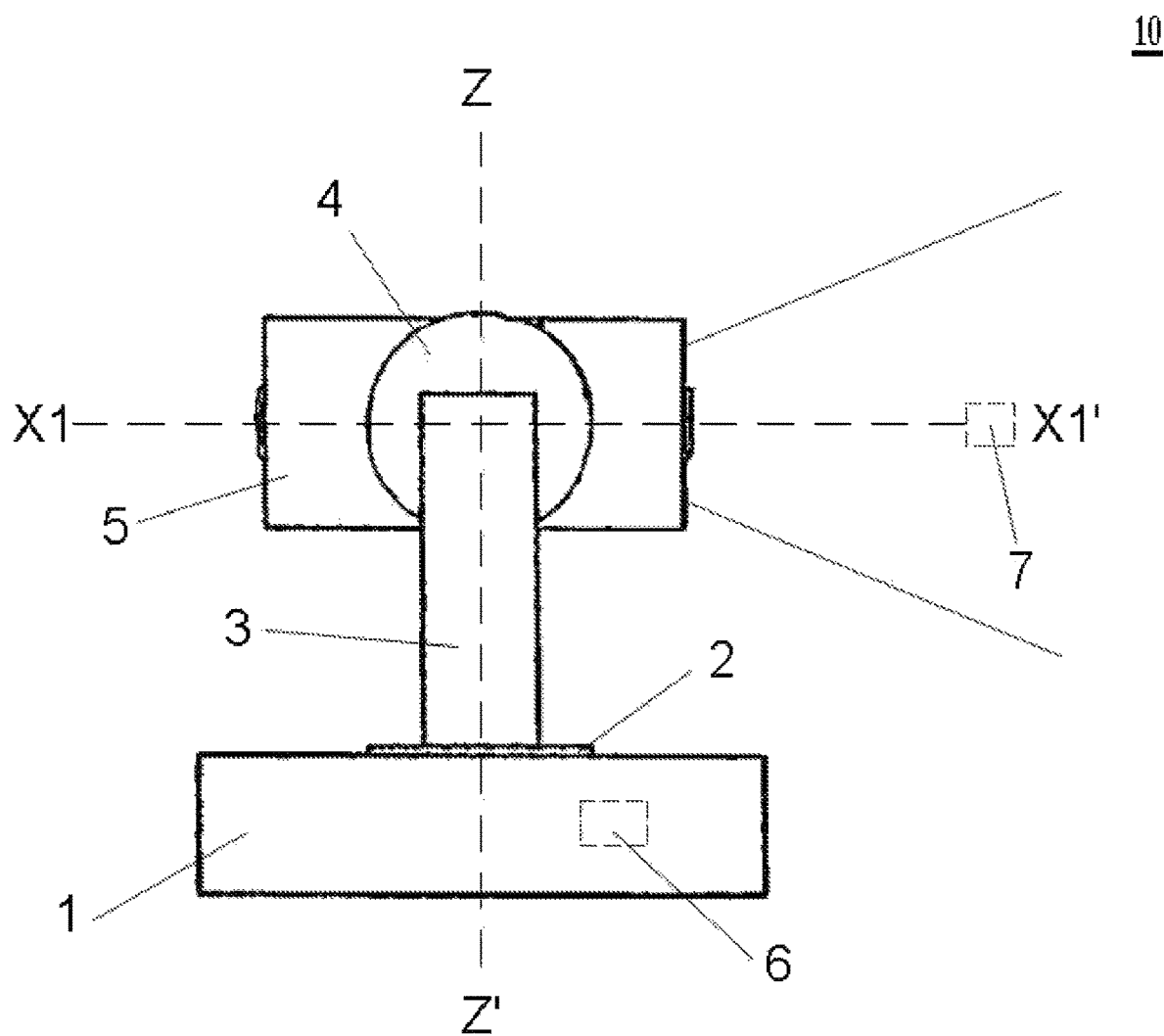
FIG. 9 is a schematic side view of the three-dimensional imaging apparatus having a function as a three-dimensional measuring device shown in FIG. 7 according to an exemplary embodiment of the present disclosure.

According to some embodiments, 3D imaging apparatus 10 may further include a second motor 4 that is arranged on a vertical supporting side of frame 3, as shown in FIGS. 7 and 9. Second motor 4 may be configured to rotate imaging device 5 about a second axis (e.g., axis YY') in accordance with a second rotation signal from the control module (not shown) disposed within the 3D imaging apparatus 10. In an embodiment, the second axis may be perpendicular to the first axis. Accordingly, second motor 4 may generate a pitch motion for imaging device 5 in addition to the rotational motion generated by first motor 2. In some exemplary embodiments, second motor 4 may be a servo motor or a step motor.

According to a further embodiment, the second rotation signal may indicate a second expected rotational angle. In response to the second rotation signal, second motor 4 may rotate imaging device 5 around the second axis from a second initial position to a second target position according to the second expected rotational angle. When second motor 4 stops at the second target position, imaging device 5 may be triggered to capture a set of data of the 3D scene.

According to a further embodiment, second motor 4 may rotate and stop for multiple times based on the second rotation signal. At each stop, imaging device 5 may be activated to collect a set of data of the 3D scene. For example, imaging device 5 may be activated to capture a 2D image and/or to conduct a scanning of the 3D scene. Second motor 4 may rotate for 360° or until a desired amount of data is collected.

According to a further embodiment, as shown in FIGS. 6-9, frame 3 may have a U shape, the bottom of which is fixed to first motor 2. The two vertical supporting sides of frame 3 may be fixed to the opposite sides of imaging device 5 through second motor 4.

In some exemplary embodiments, 3D imaging apparatus 10 may further include a detection circuit 6 electrically connected to first motor 2, second motor 4, and imaging device Detection circuit 6 may be configured to detect and compare the rotations of motors 2 and 4 with the expected rotational angles indicated by the first rotation signals and the second rotation signals. Based on the comparisons, detection circuit 6 may detect errors in the motions of motors 2 and 4.

For example, the angle between the first initial position and the first target position of first motor 2 may be different from the first expected rotational angle indicated by the first rotation signal received by first motor 2. Similarly, the angle between the second initial position and the second target position of second motor 4 may be different from the second expected rotational angel indicated by the second rotation signal received by second motor 4. In other words, there may be errors in the rotations of first motor 2 and second motor 4 due to, for example, mechanical or electrical variations. Thus, it is desired to determine the errors in the rotations of first motor 2 and second motor 4 so as to eliminate or reduce the errors when the data collected by 3D imaging apparatus 10 is used to build the 3D virtual reality model of the 3D scene.

Figure 10:
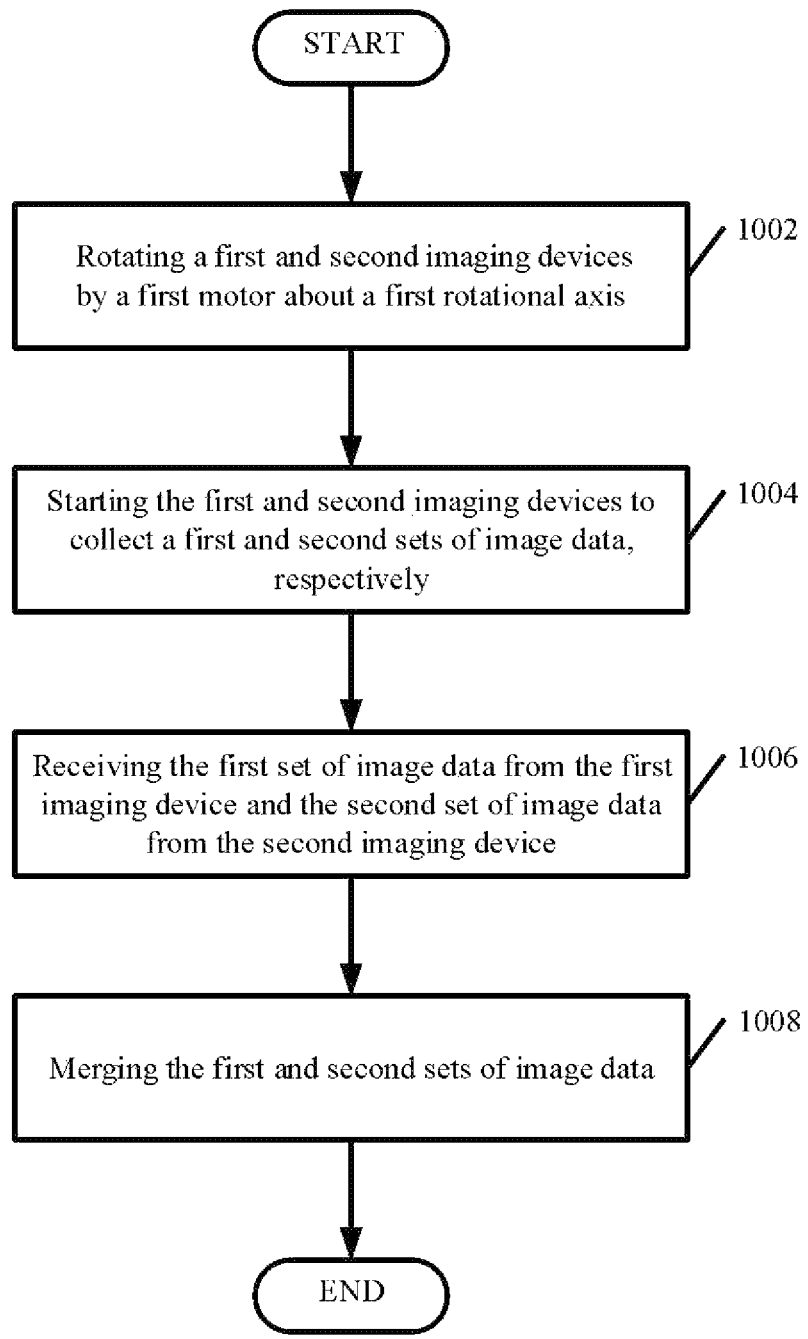
FIG. 10 is an exemplary flowchart depicting a process for operating the three-dimensional imaging apparatus according to an exemplary embodiment of the present disclosure.

FIG. 10 illustrates a process 1000 for generating a 3D virtual reality model of a 3D scene using a 3D imaging apparatus, such as 3D imaging apparatus 10 and 3D imaging apparatus 105 disclosed above, according to an embodiment. Process 1000 may be carried out by a processor according to instructions stored on a computer-readable medium. The processor and the computer-readable medium may be disposed on a control module, such as detection circuit 6 or similar circuitry that is electrically connected with the 3D imaging apparatus.

According to process 1000, at step 1002, first imaging device 200 and second imaging device 300 are rotated by motor 400 or motor 2 (i.e., the first motor) about a first rotational axis. According to an embodiment, the first rotational axis may be the rotational axis of the first motor. The first rotational axis may be along a vertical direction VV' as shown in FIGS. 3 and 4.

At step 1004, first imaging device 200 and second imaging device 300 may be started to collect a first set of image data and the second set of image data of the 3D scene, respectively. According to an embodiment, first imaging device 200 may be a camera that collects and generates two-dimensional images (i.e., the first set of image data) of the 3D scene. According to another embodiment, second imaging device 300 may be a laser ranger or a LiDAR device, as known in the art, which scans the 3D scene using light signals. Based on the light signals, second imaging device 300 may generate 3D structural data (i.e., the second set of image data) of the 3D scene, such as a point cloud. First imaging device 200 and second imaging deice 300 may also use other type of signals, such as radar signals, infrared signals, to generate the first and second sets of image data.

At step 1006, the first and second sets of image data may be received from first imaging device 200 and second imaging device 300. According to an embodiment, the first and second sets of image data may be received by an on-board processing unit or an off-board processing unit. The first and second sets of image data may be stored by a computer-readable storage medium for later processing.

At step 1008, the first and second sets of image data may be merged to form a 3D virtual reality model of the 3D scene. According to an embodiment, the first set of image data may include one or more 2D images generated by first imaging device 200. The 2D images may form a panoramic image of the 3D scene. For example, first imaging device 200 may be started to collect a series of 2D images while being rotated by the first motor about the first rotational axis. The series of 2D images may be merged to form the panoramic image of the 3D scene.

According to an embodiment, the second set of image data may include a 3D structural model of the 3D scene. The 3D structural model may include a 3D point cloud generated based on the scanning of the 3D scene performed by second imaging device 300. The 3D point cloud may include structural information indicating the 3D coordinates of features of the 3D scene.

According to an embodiment, the first set of image data and the second set of image data may be merged based on the 3D relationship between first imaging device 200 and second imaging device 300. For example, a first coordinate system may be defined for first imaging device 200 based on the location and position of first imaging device 200. The first set of image data may be associated with the first coordinate system based on the intrinsic parameters of first imaging device 200. Similarly, a second coordinate system may be defined for second imaging device 300 based on the location and position of second imaging device 300. The second set of image data may be associated with the second coordinate system based on the intrinsic parameters of second imaging device 300.

According to an embodiment, the first and second sets of image data may be merged by converting the first set of image data from the first coordinate system to the second coordinate system based on the angle between the optical axis of first imaging device 200 and the scanning plane of second imaging device 300. Alternatively, the first and second sets of image data may be merged by converting the second set of image data from the second coordinate system to the first coordinate system based on the angle between the optical axis of first imaging device 200 and the scanning plane of second imaging device 300. After the conversion, the first set of image data (i.e., the panoramic image) may be mapped to the second set of image data (i.e., the 3D structural model) to generate the 3D virtual reality model of the 3D scene. The 3D virtual reality model may include a 3D representation of the 3D scene such as structures, textures, colors of features within the 3D scene.

According to a further embodiment, steps 1002 and 1004 may be performed alternatively or at the same time. For example, the first motor may make one or more stops during the rotation of the first and second imaging devices at step 1002. When the first motor make a stop, step 1004 may be performed, at which the first and second imaging devices may be started to take the first and second sets of image data. After the first and second imaging devices complete the acquisition of the image data, process 1000 may return to step 1002, at which the first motor may be activated to continue rotating the first and second imaging devices. The process may continue until the first motor rotates for 360° or a set angle.

According to a further embodiment, the 3D imaging apparatus may include a second motor (i.e., motor 4 as shown in FIGS. 7 and 9), which is configured to rotate the first imaging device (or the second imaging device) about a second rotational axis (i.e., the rotational axis of motor 4). The second rotational axis may be along a third direction (i.e., the YY' direction as shown in FIG. 7) and perpendicular to the first rotational axis.

According to an embodiment, process 1000 may further include rotating the first imaging device (or the second imaging device) by the second motor about the second rotational axis and controlling the second motor to make one or more stops during the rotation of the first imaging device (or the second imaging device) about the second rotational axis. For example, when the first motor makes a stop as disclosed above, the second motor may rotate and also make a stop. At this time, the first and second imaging devices may be started to take the first and second sets of image data. Thereafter, the second motor may be activated and then make another stop. The first and second imaging devices may be started again to take the first and second sets of image data. The process may be continued until the acquisition of the image data is completed for the stop of the first motor. Thereafter, the first motor is activated and then make another stop. The steps above may be repeated until the first motor rotates for 360° or a set angle.

It will be appreciated that stopping of the first and second motors may switched. For example, the second motor may make a stop first. The first motor may then rotate and make one or more stops for the first and second imaging devices to take the first and second sets of image data. Then the second motor may be activated and make another stop. The steps may be repeated until the second motor rotates for 360° or a set angle.

As discussed above, due to the errors in the rotations of the first and second motors, the expected rotational angles set for the first and second motors may be different from the rotational angles by which the first and second motors actually rotate. A calibration is performed on the 3D imaging apparatus in order to determine the errors in the rotations of the first and second motors, according to various embodiments.

Figure 11:
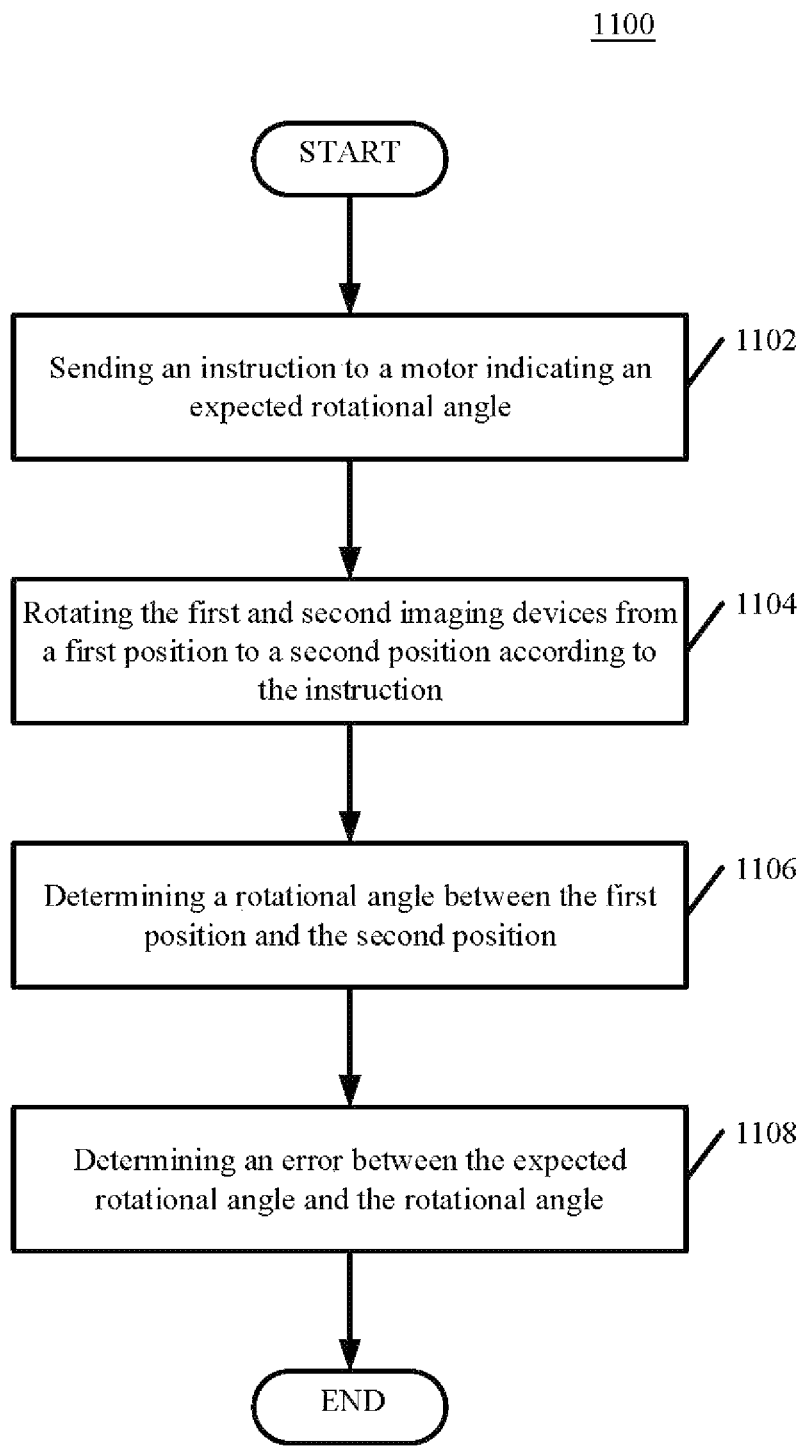
FIG. 11 is an exemplary flowchart depicting a process for operating the three-dimensional imaging apparatus according to an exemplary embodiment of the present disclosure.

FIG. 11 illustrates a process 1100 for controlling the 3D imaging apparatus to perform a calibration, according to an embodiment. It will be appreciated that process 1100 may be applied to the calibration of the first motor (i.e., motor 400 or motor 2) and the second motor (i.e., motor 4). The calibration of the first motor will be described hereinafter for purposes of illustrations. Specifically, when calibrating the first motor according to process 1100, at step 1102, a first rotational signal may be sent to the first motor. The first rotational signal may include an instruction that indicates a first expected rotational angle for the first motor. The first rotational signal may be sent by a control module on-board or off-board the 3D imaging apparatus. The first expected rotational angle may be a rotational angle set for the first motor by a user or a computer program associated with the 3D imaging apparatus.

At step 1104, the first and second imaging devices of the 3D imaging apparatus may be rotated by the first motor from a first position to a second position according to the instruction. At step 1106, a first rotational angle between the first position and the second position may be determined. At step 1108, a first error between the first expected rotational angle and the first rotational angle is determined.

According to an embodiment, the first error determined at step 1108 may be used as a parameter for processing the first and second sets of image data according to process 1000 as shown in FIG. 10. For example, the first error may be compensated or reduced when the panoramic image is formed based on the 2D images taken by the first imaging device and when the point cloud is formed based on the 3D data collected by the second imaging device.

According to a further embodiment, steps 1102-1106 may be performed for a plurality of iterations. Accordingly, a plurality of sample values of the first error may be determined. Based on the plurality of sample values, processor 1100 may further include determining a statistical distribution of the first error. The statistical distribution of the first error may be, for example, a normal distribution that is defined by parameters, such as a mean and a standard deviation. The statistical distribution may be used as a parameter for processing the first and second sets of image data according to process 1000 as shown in FIG. 10. For example, the mean of the first error may be used to compensate or reduce the misalignment when the panoramic image is formed based on the 2D images taken by the first imaging device and when the point cloud is formed based on the 3D data collected by the second imaging device.

According to a further embodiment, the first rotational angle of the first and second imaging devices disclosed above may be determined according to a calibration object. As shown in FIGS. 6-9, for example, a calibration object 7 may be disposed within the field of view of the first imaging device. When the first and second imaging devices are at the first position, the first set of image data taken by the first imaging device may include a first image of calibration object 7. The first image of calibration object 7 may be used to determine a first coordinate of calibration object 7.

When the first and second imaging devices are at the second position, the first set of image data taken by the first imaging device may include a second image of calibration object 7. The second image of calibration object 7 may be used to determine a second coordinate of calibration object 7. The first rotational angle may be determined based on the first coordinate and the second coordinate of calibration object 7 as one of ordinary skilled in the art will appreciate. The first and second coordinates disclosed above may be, for example, 3D coordinates such as Cartesian coordinates, polar coordinates, etc. Further, the first and second coordinates of calibration object 7 may be calculated according to known a technique, such as machine vision using the Perspective-n-Point (PNP) algorithm or other algorithm generally known in the art.

According to an alternative embodiment, calibration object 7 may be disposed within field of view of the second imaging device. A process similar to that disclosed above may be applied to determine the first rotational angle. According to still an alternative embodiment, the first position, the second position, and the first rotational angle of the first and second imaging devices disclosed above may be determined by other means, such as a positional sensor, a motion sensor, etc., as known in the art.

One of ordinary skill in the art will appreciate that the calibration of the second motor may also be performed according to the similar process as disclosed above. Thus, the calibration of the second motor is not repeated herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those exemplary embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A three-dimensional imaging apparatus, comprising:
   a housing having a first opening and a second opening on opposite sides of the housing;
   a first imaging device mounted within the housing; and
   a second imaging device mounted within the housing,
   wherein the first imaging device is configured to capture one or more images through the first opening to collect a first set of image data,
   wherein the second imaging device is configured to transmit and receive light through the second opening to collect a second set of image data, and
   wherein the first imaging device and the second imaging device are configured to collect the first set and second set of image data from different parts of a three-dimensional scene simultaneously.

2. The three-dimensional imaging apparatus of claim 1, wherein the second imaging device comprises:
   a transmitter configured to generate and transmit the light to the three-dimensional scene; and
   a receiver configured to receive portion of the light reflected by the three-dimensional scene.

3. The three-dimensional imaging apparatus of claim 1, wherein the light from the second imaging device is directed to scan the three-dimensional scene according to a scanning direction.

4. The three-dimensional imaging apparatus of claim 3, wherein a scanning plane is associated with the scanning direction of the second imaging device, and wherein the second imaging device is configured to collect a plurality of points of the three-dimensional scene that are in the scanning plane.

5. The three-dimensional imaging apparatus of claim 3, wherein the scanning direction of the second imaging device forms an angle with a shooting direction of the first imaging device.

6. The three-dimensional imaging apparatus of claim 1, wherein the first imaging comprises a lens system, and the lens system is close to and aligned with the first opening.

7. The three-dimensional imaging apparatus of claim 1, the second imaging device is a light detection and ranging (LiDAR) scanner.

8. The three-dimensional imaging apparatus of claim 1, wherein the first imaging device and the second imaging device are mounted next to each other within the housing, and wherein the first imaging device and the second imaging device are arranged such that the first imaging device and the second imaging device are vertically misaligned within the housing.

9. The three-dimensional imaging apparatus of claim 1, further comprising:
   a motor configured to move the first imaging device and the second imaging device to a plurality of target positions,
   wherein at each target position of the plurality of target positions, the first imaging device and the second imaging device are configured to collect the first set and second set of image data from different parts of the three-dimensional scene simultaneously.

10. The three-dimensional imaging apparatus of claim 9, wherein the motor is attachable to a tripod,
wherein when the motor is attached to a tripod, the motor is configured to rotate the first imaging device and the second imaging device horizontally relative to the tripod.

11. The three-dimensional imaging apparatus of claim 9, further comprising:
a computer-readable medium having computer-executable instructions stored thereon; and
a processor configured to execute the computer-executable instructions to carry out:
controlling the motor to move the first imaging device and the second imaging device to each target position of the plurality of target positions; and
controlling, at each target position of the plurality of target positions, the first imaging device and the second imaging device to collect the first set and second set of image data from different parts of the three-dimensional scene simultaneously.

12. The three-dimensional imaging apparatus of claim 11, wherein the processor is further configured to carry out:
merging the first and second sets of imaging data corresponding to the plurality of target positions.

13. The three-dimensional imaging apparatus of claim 11, wherein controlling the motor to move the first imaging device and the second imaging device to each target position of the plurality of target positions comprises:
controlling the motor to rotate to a first target positions of the plurality of target positions by a set angle; and
controlling the motor to rotate to a subsequent target position of the plurality of target position by the set angle,
wherein the rotation of the motor is repeated until the motor rotates for 360 degrees.

14. The three-dimensional imaging apparatus of claim 13, wherein the processor is further configured to carry out:
generating a panoramic image of the three-dimensional scene by merging the first and second sets of imaging data corresponding to the plurality of target positions.

15. A method for controlling a three-dimensional imaging apparatus having a first imaging device and a second imaging device disposed therein, the method comprising:
moving the first imaging device and the second imaging device to a plurality of target positions;
collecting, at each target position of the plurality of target positions, a first set of image data by the first imaging device and a second set of image data by the second imaging device, wherein the first imaging device and the second imaging device collect the first and second sets of image data from different parts of a three-dimensional scene simultaneously; and
merging the first and second sets of imaging data corresponding to the plurality of target positions,
wherein the first imaging device and the second imaging device are mounted in a housing having a first opening and a second opening on opposite sides of the housing,
wherein the first imaging device is configured to capture one or more images through the first opening to collect the first set of image data, and
wherein the second imaging device is configured to transmit and receive light through the second opening to collect the second set of image data.

16. The method of claim 15, wherein moving the first imaging device and the second imaging device to the plurality of target positions further comprises:
rotating the first imaging device and the second imaging device to a first target position of the plurality of target positions by a set angle; and
rotating the first imaging device and the second imaging device a subsequent target position of the plurality of target positions by the set angle,
wherein the rotation is repeated until the first imaging device and the second imaging device rotate for 360 degrees.

17. The method of claim 16, further comprising:
generating a panoramic image of the three-dimensional scene by merging the first and second sets of imaging data corresponding to the plurality of target positions.

18. The method of claim 15, wherein the second imaging device is configured to:
generate and transmit the light to the three-dimensional scene; and
receive portion of the light reflected by the three-dimensional scene.

19. The method of claim 15, wherein the light from the second imaging device is directed to scan the three-dimensional scene according to a scanning direction.

20. The method of claim 19, wherein a scanning plane is associated with the scanning direction of the second imaging device, and wherein the second imaging device is configured to collect a plurality of points of the three-dimensional scene that are in the scanning plane.

* * * * *